Patented July 16, 1940

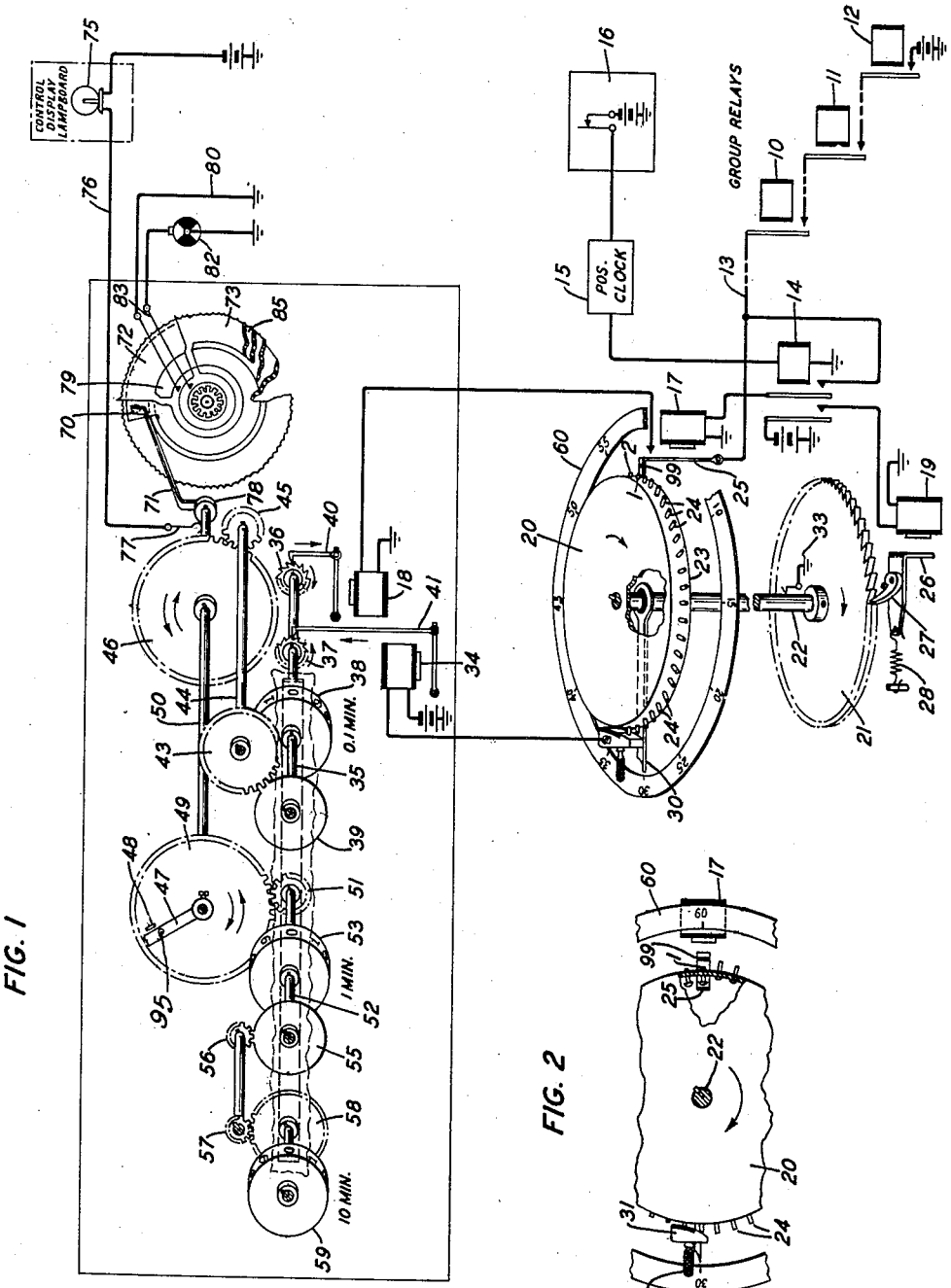

2,208,164

UNITED STATES PATENT OFFICE 2,208,164

REGISTERING DEVICE

Edward Augustus Sageman, Mount Vernon, N. Y., assignor to American Telephone and Telegraph Company, a corporation of New York Application July 1, 1937, Serial No. 151,513

5 Claims. (Cl. 235—92)

This invention relates to registering mechanisms and more particularly to a method and means for providing a visible registration of the number of times a particular transitory physical act or condition occurs during any interval of time.

In registering or recording systems generally employed to provide a check on the recurrence of a particular condition during any predetermined interval of time, it is necessary that the register or recording device be read at the beginning of the predetermined time interval and again at the end of the time interval and a mathematical calculation made to determine the difference between the two readings. This difference would be the number of times the particular condition occurred during the predetermined time interval. For example, in telephone exchange systems, a register may be employed for the purpose of checking the traffic handled by a trunk circuit. If such a trunk has been busy each time it is tested for registering purposes, at ten-second intervals, for example, the register would indicate that the trunk has tested busy six times each minute or three hundred and sixty times for a one-hour interval. The register would, therefore, display the numeral 360 or some such equivalent reading at the end of a particular hour. If it is desirable to determine how often the same trunk tested busy in a succeeding interval of time, for example, thirty minutes, the meter or register would be read at the expiration of the next thirty-minute interval. The register would now indicate the number of times the trunk tested busy during the preceding thirty-minute interval plus the number of times the trunk tested busy prior to the beginning of the thirty-minute interval, so that, in order to arrive at the figure which represents the number of times the trunk tested busy during the particular thirty-minute interval, the register reading at the beginning of the particular interval would have to be subtracted from the reading of the register at the end of the particular interval. In other words, registers heretofore employed in checking the recurrence of a particular event do not provide for the instantaneous display of a figure which represents the number of occurrences of the particular event in any immediate preceding interval of time but rather, display a figure corresponding to the number of occurrences of the event for the entire period during which the register is in operation. That is, it displays a cumulative record.

It is the object of this invention to provide in a system of registration means for instantaneously displaying on a register the number of times a particular physical act or condition occurs during any predetermined interval of time.

This object is attained in accordance with a feature of the invention by automatically and progressively operating a registering device in one direction, under control of a periodic testing mechanism, to visibly register the recurrences of a particular event during a predetermined interval of time and automatically operating the register in a reverse direction to subtract from the register the registered recurrences in the order of their occurrence, the reverse operation of the register being automatically started at the end of the predetermined time interval whereby the register, at any instant, displays the number of the recurrences of the particular event during a predetermined interval of time ending at the time the register is read.

Another feature of the invention resides in an adjustable control which determines the time at which the reverse operation of the register commences, whereby the time interval during which the recurrences of a particular event are registered, may be varied in length.

A further feature of the invention resides in the provision of means which function to display a signal of one character should the occurrence of a particular event persist during a predetermined interval of time and a signal of a different character should the occurrence of the particular event extend beyond the predetermined interval of time.

These and other features of the invention will be readily understood from the following detailed description made with reference to the accompanying drawing in which, Figure 1 illustrates schematically the registering device and the control mechanism, which cooperate in forming a system of registration embodying the features of the invention, the boxed portion constituting the registering mechanism and the equipment immediately below and to the right center of the boxed portion, the control mechanism; and Fig. 2 is an enlarged fragmentary view of a portion of the control mechanism.

The invention is illustrated as applied to a telephone exchange system to provide an instantaneous visible indication of the number of times, during a predetermined interval of time, a group busy condition prevails in a particular group of telephone lines.

Relays 10, 11 and 12 are each individual to a line in a group of lines and will be operated, in accordance with well known telephone practice, when the line associated therewith is in use. It will be apparent, therefore, that when all the lines in the group of lines are in use, the conjoint operations of relays 10, 11 and 12 will connect battery to the lead 13.

A clock mechanism, which in the present case, closes a circuit to relay 14 at six-second intervals, is represented by the block 15 and is controlled by a master clock represented by the block 16.

The clock 15 operates continuously to close a circuit to relay 14 every six seconds so that relay 14 operates at regular intervals. When relay 14 operates, its inner armature connects the winding of magnet 17 to the conductor 13, so that magnet 17 will operate if conductor 13 is supplied with battery resulting from a group busy condition of the group of lines represented by relays 10, 11 and 12.

The plus magnet 18 is normally connected to the front contact of the magnet 17 so that when magnet 17 operates, magnet 18 is connected to the lead 13 and will also operate.

At its outer armature, relay 14 when operated establishes an obvious circuit for magnet 19 which controls the operation of the disc 20 as will appear presently.

The register control mechanism comprises a ratchet wheel 21, having, in the present case, 604 teeth, which is fixed to the shaft 22. The disc 20 is keyed or otherwise fixed to the shaft 22 as illustrated, and is provided with a depending flange or rim 23 which is provided with 604 equidistant apertures each of which houses a pin, such as pins 24. The pins 24 are axially movable in their respective apertures and normally assume the position indicated by the pin 1 in Fig. 2, that is, pushed inwardly towards the center of the disc 20. The pins may be of any suitable form which will permit them to be slid back and forth in their respective apertures without falling therefrom. The pins may be constructed in any suitable manner to prevent them from falling from their respective apertures, as for example, by upsetting the ends which extend outwardly from the disc.

The magnet 17 is provided with a hook-like armature 25, the end of which normally lies opposite one of the pins 24 and which, when the magnet 17 is energized, engages the head of the pin and causes the pin to protrude from the periphery of the flange 23.

Armature 25 which forms part of a circuit through magnet 18, is insulated against ground 33 at its point of contact with pins 24 as shown at 99.

The magnet 19 is provided with ratchet armature 26 to which is secured the ratchet 27 which rides over the teeth on the ratchet wheel when the magnet 19 is energized, the armature 26 being restored to normal under the influence of spring 28 when the magnet 19 is deenergized. It will be observed that each time magnet 19 is energized the ratchet 27 is advanced to engage the next succeeding tooth in the ratchet wheel 21 and that when the magnet 19 is deenergized, the return of the armature 26 causes the ratchet 27 to rotate the ratchet wheel 21 the distance of one tooth and the disc 20 will therefore be rotated the distance of one pin. It follows from the description so far made that the disc 20 will be advanced step-by-step under control of the clock 15 at the rate of ten steps per minute so that in one minute of time ten successive pins 24 will be brought into a position opposite the armature 25 of magnet 17.

Near the upper end of shaft 22 an arm 30 is mounted so as to be movable relative to the shaft. At the outer extremity of the arm 30 there is supported an "adjustable minus contact" and pin reset device which consists essentially of a metal piece 31 having an arcuate or beveled edge facing the flange 23 and a knurled handle 32 by virtue of which the arm 30 may be manually rotated on the shaft 22 to position the contact 31 at various points on the periphery of the disc 20 for a purpose to be indicated later. The contact 31 has, near one end of its beveled edge, an insulating insert which insulates the contact 31 from pins which have already been reset as will appear from a later description.

The contact 31 is electrically connected to ground at 33 by way of the pin with which it engages, the disc 20 and shaft 22, so that when the contact 31 engages a protruding pin 24 the minus magnet 34 operates over an obvious circuit.

In the register mechanism a shaft 35 is provided which has fixedly secured thereto the plus ratchet wheel 36, the minus ratchet wheel 37, "tenths of a minute" numeral dial 38 and gear 39. The plus ratchet wheel 36 is provided with ten teeth and is controlled by the ratchet armature 40 of the magnet 18 so that each time the magnet 18 is energized the ratchet wheel 36 is advanced clockwise one tooth and the one-tenths minute dial 38 is correspondingly advanced to display the number next succeeding the previously displayed numeral.

In like manner, the minus ratchet wheel 37 is provided with ten teeth and is controlled by the ratchet armature 41 of magnet 34 so that each time the magnet 34 is energized the ratchet wheel 37 is advanced counter-clockwise one tooth and the one-tenths minute dial 38 is rotated in a reverse direction to subtract one unit from the previously displayed numeral.

The gear 39 is provided with two teeth so that each time the numeral dial 38 completes one revolution the gear 39 engages gear 43 turning it two teeth. Gear 43 is provided with twenty teeth and being turned at the rate of two teeth per minute, makes one revolution every ten minutes.

Shaft 44 which supports the twenty-toothed gear 43 also carries the gear 45 which is provided with six teeth and which, with gear 43, makes one revolution every ten minutes. The gear 45 engages gear 46 which has thirty-six teeth so that the gear 46 rotates at the rate of one revolution every hour. The gear 46 is fixed to shaft 50.

Fixed on the same shaft 50 is a drive arm 47 which engages a stop 48 integrally associated with the gear 49 which is loosely carried by the shaft 50. With the arrangement so far described all "plus" impulses coming from magnet 18 through ratchet wheel 36 and gears 39, 43, 45 and 46 to the drive arm 47 will operate the gear 49.

Gear 49 has thirty-six teeth and meshes with a six-tooth pinion gear 51 which is secured to the shaft 52 which also supports the units numeral dial 53. Thus each one-minute impulse on gear 49 will advance the units numeral dial 53 one-tenth of a revolution, registering a one-minute interval on this dial. In like manner, gears 55, 56, 57 and 58 function to cause the tens numeral dial 59 to advance one-tenth of a revolution for every complete revolution of the units numeral dial 53.

As the drive arm 47 operates gear 49 only when in contact with the stop 48, when "minus" impulses obtained through magnet 34 move the drive arm in a reverse or minus direction, gear 49 and the mechanism beyond, which includes the units and tens dials 53 and 59, will remain set. With this arrangement the units and tens dials 53 and 59 will always register to the nearest minute the number of minutes of "no circuits available" accumulated during the busiest period of its operation, this period consisting of sixty consecutive minutes or less, depending upon the setting of the "adjustable minus contact" 31 on the associated disc 20.

The driving arm 47 may be locked to the gear 49 by means of the removable pin 95 or to the stop 48 in any suitable manner so that minus impulses as well as plus impulses can be made to operate the gear 49 at will. With this lock-in effect the group busy timing register will show at all times the number of "no circuits available" minutes accumulated during the sixty minutes ending at the time of reading the register or for any lesser period depending on the setting of the "adjustable minus contact" on the associated disc.

The apparatus operates briefly in the following manner.

The ratchet wheel 21 and associated disc 20 are advanced step by step under the direct influence of magnet 19 which operates and releases every six seconds under the control of the clock 15 and relay 14, assuming the disc is in the position illustrated at the time the mechanism starts to function and that, for descriptive purposes, the mechanism starts to function at 2 P. M. At this time pin No. 1 is in alignment with armature 25.

Upon the first operation of relay 14 under the influence of the clock 15, relay 19 operates to advance the ratchet 27 into engagement with the next tooth of wheel 21 and if all lines in the group of lines are busy, relays 10, 11 and 12 will be operated causing magnet 17 to operate in a circuit extending from grounded battery, front contacts and armatures of relays 10, 11 and 12, conductor 13, front contact and inner armature of relay 14 to ground through the winding of magnet 17. Magnet 17 accordingly operates and its armature drives pin No. 1 outwardly from the rim or flange of disc 20. Magnet 17 also connects the winding of magnet 18 to conductor 13 so that this magnet operates causing the "plus" ratchet wheel 36 to be advanced one unit. The one-tenths numeral dial also advances to display the numeral 1 indicating one-tenth of a minute during which no circuits were available or during which the group of lines was busy. Upon release of clock 15, magnet 19 is deenergized allowing the tension upon spring 28 to rotate ratchet wheel 21 1/604 of a revolution thereby placing pin No. 2 opposite armature 25 ready for the next operation.

Assuming, for descriptive purposes, that pin 2 was driven into the rim of disc 20 and that the third pin was brought into alignment with the armature 25 as a consequence of the second operation of the clock mechanism, it will now be assumed that, when the clock mechanism functions for the third time, one of the lines in the group of lines indicated by relays 10, 11 and 12 was idle. Under this condition, when relay 14 operates in response to the third clock impulse, relay 19 operates, as before, but magnets 17 and 18, failing to find battery on lead 13 do not operate so that the third pin is not driven outwardly from the rim of disc 20 nor is the plus ratchet wheel 36 actuated to register another unit on the one-tenth minute numeral dial 38. When relay 14 releases at the expiration of the third clock impulse, magnet 19 is deenergized and the ratchet 27 propels the ratchet wheel 21 and with it the disc 20 one step under the influence of spring 28. The fourth pin now is in alignment with the armature 25 of magnet 17. The device has so far functioned for three six-second intervals during which the line group has tested busy twice, that is, pins 1 and 2 have been driven outwardly from the rim of disc 20 and the third pin has not. The one-tenth minute numeral dial 38 would accordingly display the numeral 2 indicating that the line group tested busy twice during the first three-tenths of a minute or eighteen seconds in which the mechanism was functioning.

For the sake of illustration it will now be assumed that the disc 20 has been advanced three hundred steps corresponding to an interval of time of thirty minutes and that the "adjustable minus contact" 31 is located as shown in the drawing, that is, in alignment with the numeral 30 on the scale 60 which encircles the disc 20 and is supported in any suitable manner. It will also be assumed that, except for the third six-second interval, as already described, the line group was found busy at all times so that two hundred ninety-nine pins 24 have been driven outwardly from the rim of the disc 20 and pin No. 3 remains in its normal position. Under this condition the register dials 59, 53 and 38 will read at 2:30 P. M., 2, 9, 9, respectively, indicating an interval of twenty-nine and nine-tenths minutes of "no circuits available" time or that the line group has tested busy two hundred and ninety-nine times during the first half hour of operation.

On the next or 301st operation and release of magnet 19 the disc 20 will be advanced another step bringing pin No. 301 into alignment with the armature 25 of magnet 17. To further illustrate the operation of the apparatus it will now be assumed that during the intervals when pins Nos. 301, 302 and 303 are in position to be actuated by the armature 25 of magnet 17, one or more of the lines of the line group were idle, under which circumstance these pins would not be driven outwardly from the rim of the disc 20 and the "plus" ratchet wheel 36 would not have been actuated to register further increments of "no circuits available" time.

Reverting back now to the 300th interval, it will be noted that as the disc 20 is rotated by the 301st impulse, pin No. 1 will be moved into engagement with the "adjustable minus contact" 31 and a circuit established from grounded battery, winding of magnet 34, contact 31, pin No. 1, disc 20 and shaft 22 to ground. Magnet 34 accordingly operates and through the agency of its armature 41 and "minus" ratchet wheel 37 causes the one-tenth minute numeral dial 38 to be rotated in a counter-clockwise direction so that the numeral dials 59, 53 and 38 will now display the numerals 2, 9, 8, respectively indicating that during the half hour between 2:00:06 P. M. and 2:30:06 P. M. the line group was busy for twenty-nine and eight-tenths minutes which is the correct registration under the assumed conditions in which pins Nos. 3 and 301 have not been operated.

On the next impulse from the clock 15 the disc 20 will be advanced another step placing the No. 302 pin in alignment with the armature 25 of magnet 17 and causing pin No. 2 to engage contact 31 and actuate magnet 34 to subtract another unit from the one-tenth numeral dial 38. The dials 59, 53 and 38 now display the numerals 2, 9, 7, respectively, indicating that during the half hour between 2:00:12 P. M. and 2:30:12 P. M. the line group was busy for a period of twenty-nine and seven-tenths minutes. This is the correct registration of "no circuits available" time since we have assumed a condition wherein pins Nos. 3, 301 and 302 were not operated which corresponds to an interval of three-tenths minute.

On the next, or 303rd impulse, pin 303 has been positioned opposite the armature 25 of magnet 17 and pin No. 3, which we have assumed was not operated passes by the contact 31 without making contact therewith so that magnet 34 is not operated, nor is magnet 17 operated since we have assumed that a line or lines in the line group were idle during the 303rd impulse. The dials 59, 53 and 38 would accordingly still display the numerals 2, 9, 7, indicating that during the half hour between 2:00:18 P. M. and 2:30:18 P. M. the line group was busy for twenty-nine and seven-tenths minutes. This also is the correct registration of "no circuits available" time, since we have assumed that pins Nos. 301, 302 and 303 were not operated.

It is believed unnecessary to follow the operations of the mechanism through any further steps since the description just given covers all the essential points.

If it is desirable to check the time of "no circuits available" for any other time interval it is only necessary to rotate the arm 30 until the contact 31 is located opposite the numeral on the guide 60 corresponding to the time interval desired, for example, to check the "no circuits available" time for an hour, the contact 31 would be moved until it coincided with the numeral 60 on the guide 60, or to check the "no circuits available" time for a period of forty-five minutes the contact 31 would be moved until it coincided with the numeral 45 on the guide, etc.

As the actuated pins 24 wipe the contact 31 they are reset, that is, they are returned to their normal positions under the influence of the arcuate or beveled edge of the contact element.

The disc 20 as hereinbefore indicated is provided with six hundred and four pins 24, there being four or more extra pins added to allow space for the resetting of the pins by the contact element 31 which, as illustrated, constitutes a combined "adjustable minus contact" and pin reset mechanism.

To the extreme right of the register mechanism shown in Fig. 1 there is illustrated an additional device which functions as an alarm or visual indicator to apprise an attending operator of the persistence of a group busy condition beyond a predetermined interval of time.

As hereinbefore stated the shaft 50 makes a complete rotation once an hour (provided the line group is busy for the complete hour). A wiping contact 70 secured to arm 71 which in turn is fixed to the shaft 50 is adapted to wipe over the discs 72 and 73, the latter disc overlapping the former for a portion, for example, five-sixths, of its area. The disc 72 accordingly is effective for a ten-minute period or for one-sixth of a revolution of shaft 50 whereas the disc 73 which is five-sixths of an annular ring becomes effective after the ten-minute period and remains effective thereafter for the balance of a revolution of shaft 50.

As the mechanism starts to function, the shaft 50 rotates causing the contact 70 to be moved off normal into engagement with the disc 72. A circuit thereupon exists which may be traced from grounded battery, filament of lamp 75, conductor 76, brush 77, contact ring 78 secured to shaft 50, arm 71, disc 72, contact 79 to ground by way of conductor 80. The lamp 75 is accordingly lighted steadily and will remain so lighted until the contact 70 moves off the disc 72 and onto the disc 73. In other words, as long as the accumulated period of "no circuits available" time does not exceed ten minutes, the lamp 75 will burn steadily.

As soon as the accumulated period of "no circuits available" time exceeds ten minutes, the contact 70 engages the disc or ring 73 with the result that the lamp 75 is caused to flash in an obvious circuit which includes the interrupter 82 and contact 83. The disc or ring 73 has its under surface insulated as illustrated by the numeral 85 and the discs 72 and 73 may be adjusted to change the time element for steady and flashing light signals.

What is claimed is:

1. In a system for counting and registering the number of occurrences of a frequency recurring event over a predetermined interval of time, a two-way register, a control device including a rotatable disc accommodating a plurality of displaceable pins, means responsive to the occurrence of the event for causing the operation of said register in one direction and simultaneously displacing a pin carried by said disc, means for advancing the disc step-by-step, and means effective at the expiration of the predetermined time interval and controlled by the displaced pin for operating said register in a different direction.

2. In a system for counting and registering the number of occurrences of a recurring event during a predetermined interval of time, a two-way register, control means for said register comprising a rotatable disc having a plurality of displaceable pins located about the periphery thereof, clock-controlled means for stepping said disc at regular intervals, electromagnetic means for displacing one of the pins of said disc for each occurrence of the event, means controlled by said electro-magnetic means for advancing said register in one direction simultaneously with the displacement of a pin of said disc, a pin resetting contact located in the path traversed by the displaced pin, electromagnetic means operating in response to the engagement of a displaced pin with said pin resetting contact for actuating said register in another direction and an arm supporting said pin resetting contact manually rotatable about the axis of said disc whereby said pin resetting contact may be adjustably positioned with respect to the periphery of said disc.

3. In a system for counting and registering the number of occurrences of a recurring event during a predetermined interval of time, a two-way register, electromagnetic means for operating said register in one direction, electromagnetic means for operating said register in another direction, a rotatable disc having a plurality of displaceable pins arranged about its periphery, means responsive to an occurrence of the event for displacing one of said pins and simultaneously actuating said first electromagnetic means, a pin resetting contact electrically included in the circuit for said second electromagnetic means, clock-controlled means for stepping said disc and its displaced pin to a position wherein the displaced pin engages the pin resetting contact and completes the circuit to said second electromagnetic means whereupon said second electromagnetic means operates a predetermined period of time after the operation of said first electromagnetic means caused by the occurrence of the event, and means for variable positioning said pin resetting contact about the periphery of said disc whereby the time elapsing between the occurrence of the event and the operation of said second electromagnetic means may be varied.

4. In a system for counting and registering the occurrences of a recurring event during a predetermined interval of time, a two-way register, an electromagnetic device for operating said register in one direction, an electromagnetic device for operating said register in another direction, a rotatable disc having a plurality of radially displaceable pins disposed about the periphery thereof, means responsive to the occurrence of the event for displacing one of said pins and causing it to project from the periphery of said disc, said means also functioning to cause the operation of said first electromagnetic device, a pin resetting device located adjacent the periphery of said disc at a point whose distance from the point at which the pin is projected measured on the disc periphery is a measure of said predetermined interval of time, means for rotating said disc to cause the projected pin to engage said pin resetting device whereupon an electric circuit is completed to the winding of said second electromagnetic device by way of the projected pin and said pin resetting device to cause the operation of said second electromagnetic device, and manually operable means for variably positioning said pin resetting device with respect to the point on the disc periphery at which the pin is projected.

5. In a system for counting and registering the number of occurrences of a frequently recurring event over a predetermined interval of time, a two-way register, a control device including a rotatable disc accommodating a plurality of displaceable pins, means responsive to an occurrence of the event for causing the operation of said register in one direction and simultaneously displacing a pin carried by said disc, means for advancing the disc step by step, and means comprising a pin reset mechanism effective at the expiration of the predetermined time interval and cooperating with the displaced pin for causing said register to operate in a different direction and for simultaneously resetting the displaced pin.

EDWARD AUGUSTUS SAGEMAN.